(12) United States Patent
Schilling et al.

(10) Patent No.: US 8,375,695 B2
(45) Date of Patent: *Feb. 19, 2013

(54) AIRCRAFT GAS TURBINE ENGINE COUNTER-ROTATABLE GENERATOR

(75) Inventors: Jan Christopher Schilling, Middletown, OH (US); Peter David Toot, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 904 days.

This patent is subject to a terminal disclaimer.

(21) Appl. No.: 12/495,163

(22) Filed: Jun. 30, 2009

(65) Prior Publication Data

US 2010/0326050 A1 Dec. 30, 2010

(51) Int. Cl.
*H02K 16/02* (2006.01)
(52) U.S. Cl. ..................... 60/39.162; 310/114
(58) Field of Classification Search ............ 60/39.162, 60/268, 801, 802; 290/1 A, 55, 52; 310/115, 310/156.34, 114, 191, 266, 166, 168, 169
See application file for complete search history.

(56) References Cited

U.S. PATENT DOCUMENTS

| | | | |
|---|---|---|---|
| 1,227,185 A | 5/1917 | Nueland | |
| 3,673,802 A | 7/1972 | Krebs et al. | |
| 4,251,987 A | 2/1981 | Adamson | |
| 4,827,712 A | 5/1989 | Coplin | |
| 6,158,210 A | 12/2000 | Orlando | |
| 6,175,178 B1 | 1/2001 | Tupper et al. | |
| 6,211,597 B1 | 4/2001 | Nakano | |
| 6,531,799 B1 | 3/2003 | Miller | |
| 6,710,492 B2 | 3/2004 | Minagawa | |
| 6,739,120 B2 | 5/2004 | Moniz et al. | |
| 6,774,591 B2 | 8/2004 | Arimitsu et al. | |
| 7,216,475 B2 | 5/2007 | Johnson | |
| 7,250,702 B2 | 7/2007 | Abou Akar et al. | |
| 7,489,060 B2 | 2/2009 | Qu et al. | |
| 7,508,157 B1 | 3/2009 | Gabrys | |
| 8,063,528 B2* | 11/2011 | Toot | 310/114 |

(Continued)

FOREIGN PATENT DOCUMENTS

| | | |
|---|---|---|
| EP | 1653064 A2 | 5/2006 |
| EP | 1931015 A2 | 6/2008 |

(Continued)

OTHER PUBLICATIONS

Ep Search Report dated May 8, 2012 from corresponding EP Application No. 10194547.5.

(Continued)

*Primary Examiner* — Ehud Gartenberg
*Assistant Examiner* — Vikansha Dwivedi
(74) *Attorney, Agent, or Firm* — William Scott Andes; Steven J. Rosen

(57) ABSTRACT

An aircraft gas turbine engine includes a counter-rotatable generator driven by a turbine includes a generator stator and counter-rotatable radially inner pole and outer magnet rotors. A gearbox may be used for counter-rotating the pole and magnet rotors. Counter-rotatable first and second sets of booster stages may be co-rotatable with corresponding ones of the pole and magnet rotors. The generator and the gearbox may be disposed within a booster cavity or a tail cone of the engine. The magnet rotor, the pole rotor, and the stator may be concentric. A particular embodiment of generator includes the magnet rotor encircling the pole rotor, the pole rotor encircling the stator, a rotor air gap between the magnet and pole rotors, and a transformer air gap between the pole rotor and the stator. The counter-rotatable generator may be driven directly by a counter-rotatable turbine.

26 Claims, 13 Drawing Sheets

U.S. PATENT DOCUMENTS

| | | |
|---|---|---|
| 2004/0070211 A1 | 4/2004 | Franchet et al. |
| 2004/0255590 A1 | 12/2004 | Rago et al. |
| 2007/0087892 A1 | 4/2007 | Orlando et al. |
| 2008/0143115 A1 | 6/2008 | Kern et al. |
| 2008/0150287 A1 | 6/2008 | Kern et al. |

FOREIGN PATENT DOCUMENTS

| | | |
|---|---|---|
| EP | 2273657 A1 | 1/2011 |
| WO | WO9929027 A1 | 6/1999 |
| WO | 2005/057755 A1 | 6/2005 |
| WO | WO2008081187 A2 | 7/2008 |
| WO | 2009/128287 A1 | 10/2009 |

OTHER PUBLICATIONS

European Search Report, EP10167144, Mar. 5, 2011, 8 pages.

* cited by examiner

AIRCRAFT GAS TURBINE ENGINE COUNTER-ROTATABLE GENERATOR

BACKGROUND OF THE INVENTION

1. Field of the Invention

The invention relates to aircraft gas turbine engine electrical generators and, more particularly, to aircraft gas turbine engine electrical generators with counter-rotatable rotors.

2. Description of Related Art

An aircraft gas turbine engine of the turbofan type generally includes a forward fan and booster compressor, a middle core engine, and an aft low pressure power turbine. The core engine includes a high pressure compressor, a combustor, and a high pressure turbine in a serial flow relationship. The high pressure compressor and high pressure turbine of the core engine are interconnected by a high pressure shaft. The high pressure compressor, turbine, and shaft essentially form the high pressure rotor or spool. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor. The gas stream leaving the high pressure turbine is expanded through a second or low pressure turbine. The low pressure turbine rotatably drives the fan and booster compressor via a low pressure shaft, all of which form the low pressure rotor or spool. The low pressure shaft extends through the high pressure rotor.

Some fan jet engines have been designed with counter-rotating turbines that power counter-rotating fans and boosters or low pressure compressors. U.S. Pat. Nos. 4,790,133, 4,860,537, 5,307,622 and 6,732,502 disclose counter-rotating low pressure turbines (LPT) that power counter-rotating fans and booster or low pressure compressors. Most of the thrust produced is generated by the fan. There are also various designs for counter-rotating fan engines that use gearboxes to effect counter-rotation of the fans and boosters. Counter-rotating fans, boosters, and turbines greatly enhance the engine's fuel efficiency. Conventional boosters are extremely inefficient at low speeds and result in higher stage counts to achieve reasonable efficiencies. Aircraft turbofan gas turbine engines with counter-rotating boosters have been developed to provide highly efficient boosters with a relatively low number of booster stages.

Aircraft systems are increasingly being designed to accommodate greater and greater electrical loads. Electrical power is extracted mechanically from the engines that power the aircraft. When operating an aircraft engine at relatively low power levels, e.g., while idly descending from altitude, extracting electrical power from the engine mechanical power may reduce the ability to operate the engine properly. Current turbofan aircraft gas turbine engines requiring higher demands for aircraft power utilize very large generators mounted to a core (high pressure rotor) driven gearbox. At flight conditions where lower thrust and high electric power is required, such as approach, the core must run fast to keep up the electrical power demand but the result is more thrust which must be spoiled to maintain approach speeds, thus, reducing fuel efficiency.

Electrical power may be extracted from the high-pressure (HP) engine spool in a gas turbine engine. The relatively high operating speed of the HP engine spool makes it an ideal source of mechanical power to drive the electrical generators connected to the engine. However, it is desirable to draw power from other sources within the engine, rather than to rely solely on the HP engine spool to drive the electrical generators. The low-pressure (LP) engine spool provides an alternate source of power transfer, however, the relatively lower speed of the LP engine spool typically requires the use of a gearbox, as slow-speed electrical generators are often larger than similarly rated electrical generators operating at higher speeds. Electrical generators operating off the LP rotor or spool require large generators due to low speeds of the LP rotor or gearboxes to increase speed. These generators are a simple rotor and stator configuration.

Therefore, there is a need for an electrical generator for aircraft turbofan gas turbine engines that can be used to provide a great amount of electrical power over a wide range of engine operating speeds.

SUMMARY OF THE INVENTION

An aircraft gas turbine engine includes a counter-rotatable generator drivenly connected to a turbine and having a generator stator and counter-rotatable radially inner pole and outer magnet rotors. The engine may further include a gearbox operably disposed between the turbine and the counter-rotatable generator for counter-rotating the radially inner pole and outer magnet rotors during engine operation.

In a more particular embodiment of the counter-rotatable generator, the radially outer magnet rotor, the radially inner pole rotor and the generator stator are concentric about an engine centerline with the radially outer magnet rotor encircling the radially inner pole rotor and the radially inner pole rotor encircling the generator stator. The counter-rotatable generator further includes a rotor air gap between the magnet and pole rotors and a transformer air gap between the pole rotor and the stator.

One embodiment of the engine further includes a fan section including a fan stage of fan blades and a counter-rotatable booster including counter-rotatable first and second sets of booster stages downstream of the fan section. The fan stage of fan blades and the first set of booster stages is co-rotatable with a first one of the radially inner pole and outer magnet rotors. The second set of booster stages is co-rotatable with a second one of the radially inner pole and outer magnet rotors. The counter-rotatable generator and the gearbox may be disposed within a booster cavity of the engine located radially inwardly of the counter-rotatable first and second sets of booster stages of the counter-rotatable booster. First booster blade rows of the first set of booster stages may be interdigitated with second booster blade rows of the second set of booster stages.

A more particular embodiment of the engine further includes the turbine being a low pressure turbine and the pole rotor, the fan stage, and the first set of booster stages drivenly connected to the low pressure turbine. The outer magnet rotor and the second set of booster stages are drivenly connected counter-rotatably with respect to the fan stage through the gearbox to the low pressure turbine.

The gearbox may include an annular carrier supported by a fan frame of the engine and planetary gears rotatably mounted on pins cantilevered off the annular carrier. A sun gear is meshed with and rotatably mounted radially inwardly of the planetary gears. A ring gear is meshed with and rotatably mounted radially outwardly of the planetary gears. The second set of booster stages is connected to the sun gear and the sun gear is drivenly connected to the low pressure turbine by a low pressure shaft.

Another embodiment of the fan aircraft gas turbine engine includes a fan section with counter-rotatable forward and aft fan stages and a counter-rotatable booster including counter-rotatable first and second sets of booster stages downstream of the fan section. The first set of booster stages is connected to and rotatable with the forward fan stage and the second set of booster stages is connected to and rotatable with the aft fan stages. The counter-rotatable generator is directly drivenly connected to counter-rotatable first and second turbine sections of the low pressure turbine.

Alternatively, the counter-rotatable generator may be directly drivenly connected to annular counter-rotatable low pressure inner and outer drum rotors of the low pressure turbine.

A more particular embodiment of the counter-rotatable generator includes the pole rotor having pole assemblies with pole hubs supporting corresponding sets of rotatable axially extending bar poles. Each of the bar poles includes a radially outer bar connected by a radially extending connector to a respective one of the pole hubs. The stator includes a generally cylindrically annular center pole section circumscribed and centered about a centerline and having stationary first and second axial windings wound around annular axial poles. Radial poles extend radially outwardly from the center pole section and may be centered between the axial windings. Radial windings are wound around the radial poles.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
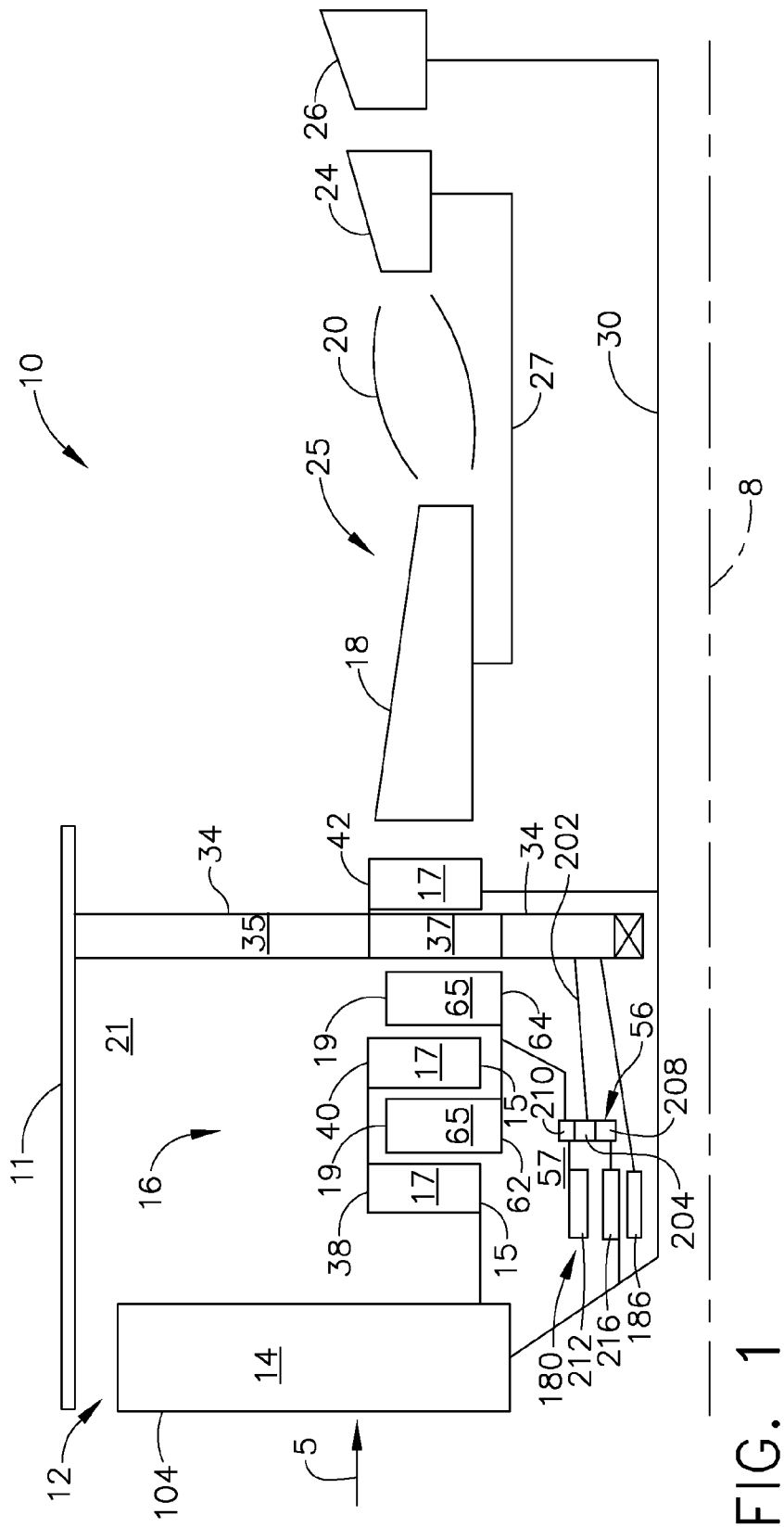
FIG. 1 is a longitudinal sectional view diagrammatical illustration of an exemplary embodiment of an aircraft turbofan gas turbine engine with counter-rotatable booster stages and a counter-rotatable electrical generator.
Figure 2:
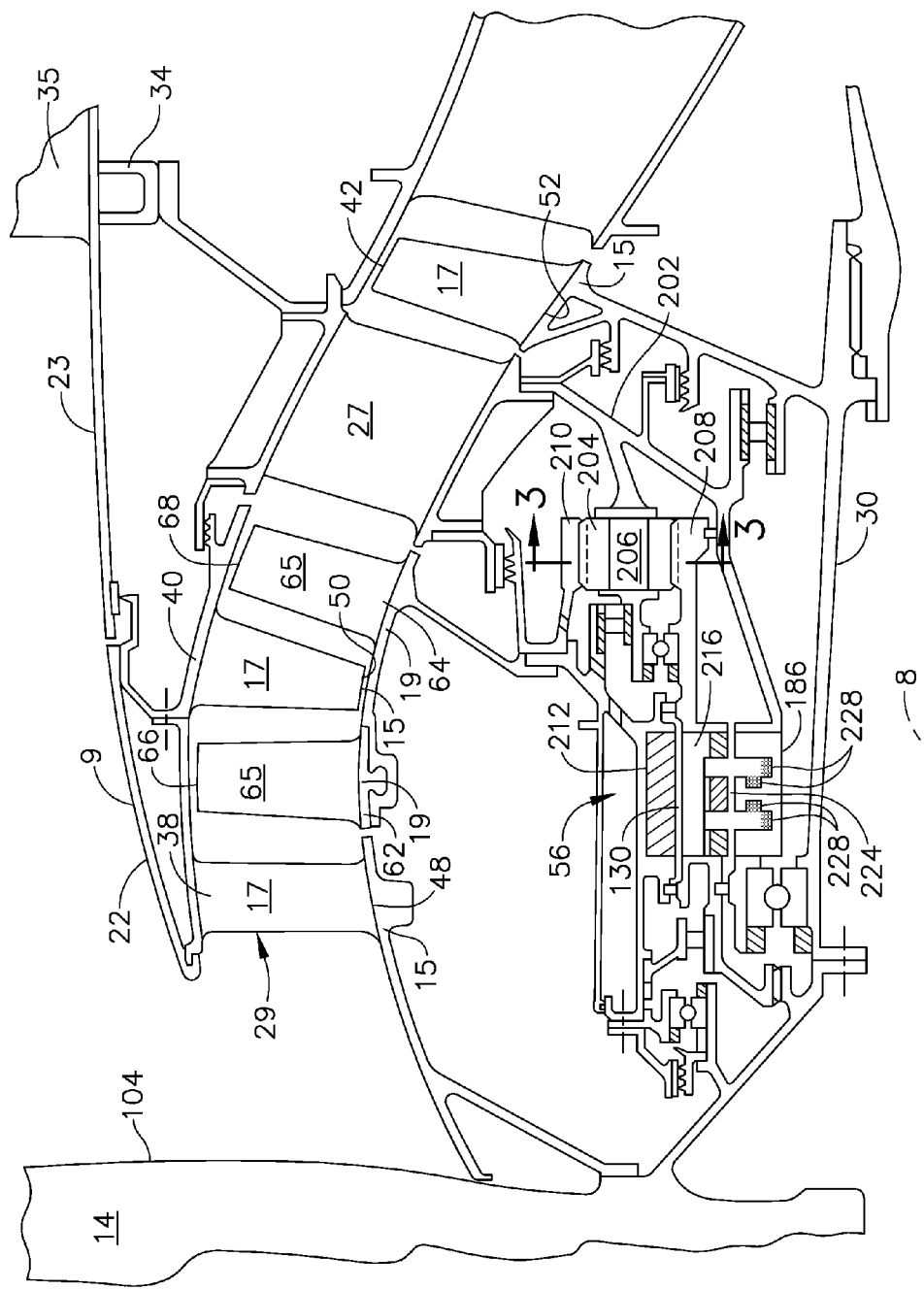
FIG. 2 is an enlarged more detailed longitudinal sectional view illustration of the counter-rotatable booster stages and counter-rotatable electrical generator illustrated in FIG. 1.

Diagrammatically illustrated in FIGS. 1 and 2 is an exemplary turbofan gas turbine engine 10 circumscribed about an engine centerline 8 and having a fan section 12 which receives inlet airflow of ambient air 5. The fan section 12 includes a single fan stage 104 of fan blades 14. Downstream of the fan section 12 is a counter-rotatable booster 16 with counter-rotatable first and second sets of booster stages 15, 19. The first set of booster stages 15 includes first, third, and fifth booster stages 38, 40, 42 of rotatable booster blades 17. The second set of booster stages 19 includes counter-rotatable second and fourth booster stages 62, 64 with counter-rotatable booster blades 65. One of the first and second sets of booster stages 15, 19 is rotatable in a clockwise direction about the engine centerline 8 and another of the first and second sets of booster stages 15, 19 is rotatable in a counter-clockwise direction about the engine centerline 8. Thus, the first and second sets of booster stages 15, 19 may be described as being counter-rotatable with respect to each other.

The first, third, and fifth booster stages 38, 40, 42 have first, third, and fifth booster blade rows 48, 50, 52, respectively. The second and fourth booster stages 62, 64 have second and fourth booster blade rows 66, 68, respectively. The first and third booster blade rows 48, 50 are interdigitated with the second and fourth booster blade rows 66, 68.

Referring to FIG. 1, following the fan section 12 is a high pressure compressor (HPC) 18, a combustor 20 which mixes fuel with the air 5 pressurized by the HPC 18 for generating combustion gases which flow downstream through a high pressure turbine (HPT) 24, and a low pressure turbine (LPT) 26 from which the combustion gases are discharged from the engine 10. A high pressure shaft 27 joins the HPT 24 to the HPC 18. The high pressure compressor 18, combustor 20, and high pressure turbine 24 collectively are referred to as a core engine 25 which includes, for the purposes of this patent, the high pressure shaft 27.

Referring to FIGS. 1 and 2, the single fan stage 104 is drivenly connected to the low pressure turbine 26 by a low pressure shaft 30. The first set of booster stages 15 is also drivenly connected to the low pressure shaft 30. The second set of booster stages 19 is drivenly connected through a differentially geared gearbox 56 to the low pressure shaft 30 so as to be counter-rotatable with respect to the fan stage 104. The gearbox 56 is disposed within a booster cavity 57 of the engine located radially inwardly of the counter-rotatable first and second sets of booster stages 15, 19 of the counter-rotatable booster 16.

Figure 3:
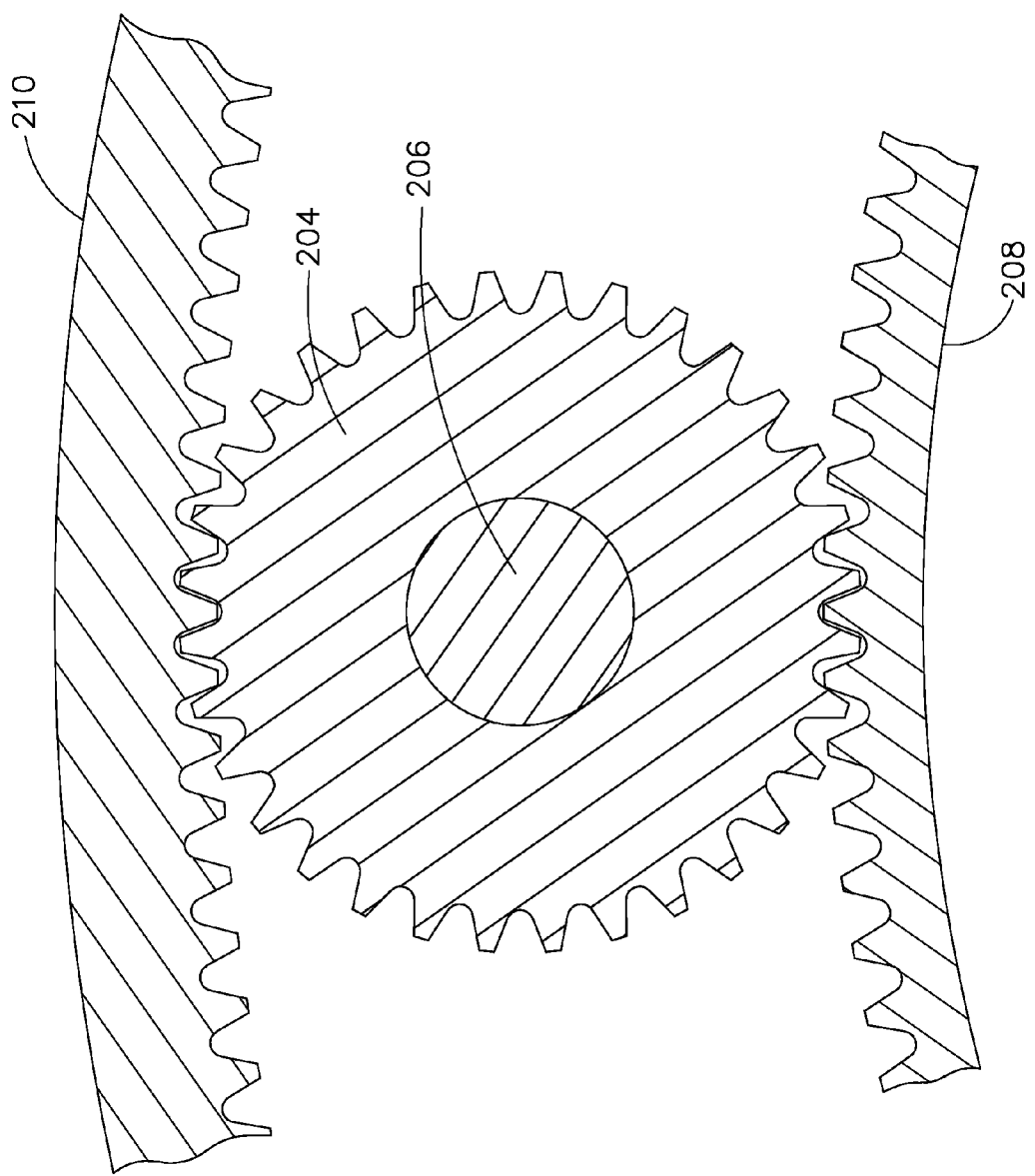
FIG. 3 is an axial view diagrammatical illustration of a differential gearbox through which the counter-rotatable electrical generator is driven as taken through 3-3 in FIG. 2.

The gearbox 56, as further illustrated in FIG. 3, includes an annular carrier 202 supported by a fan frame 34 and planetary gears 204 rotatably mounted on pins 206 cantilevered off the annular carrier 202. A sun gear 208 is meshed with and rotatably mounted radially inwardly of the planetary gears 204 and a ring gear 210 is meshed with and rotatably mounted radially outwardly of the planetary gears 204. The sun gear 208 is drivenly connected to the low pressure turbine 26 by the low pressure shaft 30. The sun gear 208 is operable to drive the planetary gears 204 which, in turn, are operable to drive the ring gear 210 counter-rotatably with respect to the sun gear 208. The second set of booster stages 19 are connected to the ring gear 210 so as to be counter-rotatable with respect to the fan stage 104 and the first set of booster stages 15.

Illustrated in FIGS. 1 and 2 is a counter-rotatable generator 180 disposed within the booster cavity 57. The counter-rotatable generator 180 has an axis of rotation coinciding with the engine centerline 8 about which a generator stator 186 is disposed. The generator stator 186 is mounted to and supported by the fan frame 34. A radially inner pole rotor 216 encircles the generator stator 186 and a radially outer magnet rotor 212 encircles the radially inner pole rotor 216 to counter-rotate during the engine's operation. The radially outer magnet rotor 212 is counter-rotatable with respect to the radially inner pole rotor 216. The pole rotor 216 is drivenly connected to the low pressure turbine 26 by the low pressure shaft 30 and, thus, is co-rotatable with the fan stage 104 and the first set of booster stages 15. The magnet rotor 212 is drivenly connected to the ring gear 210 and, thus, is counter-rotatable with respect to the pole rotor 216 and co-rotatable with the second set of booster stages 19. A generator stator 186 is mounted to and supported by the fan frame 34. The radially outer magnet rotor 212 and the radially inner pole rotor 216 and the generator stator 186 are concentric about a centerline which coincides with the engine centerline 8 as illustrated herein. Furthermore, in the exemplary embodiment of the counter-rotatable generator 180 illustrated herein, the radially outer magnet rotor 212 and the radially inner pole rotor 216 and the generator stator 186 are axially co-extensive. The counter-rotatable generator 180 includes a rotor air gap 130 between the magnet and pole rotors 212, 216 and a transformer air gap 224 between the pole rotor 216 and the stator 186. Patent Application 230317-2, entitled "COUNTER-ROTATABLE GENERATOR", filed Jun. 15, 2009, assigned to the present assignee discloses a counter-rotatable generator and is incorporated herein by reference.

Figure 4:
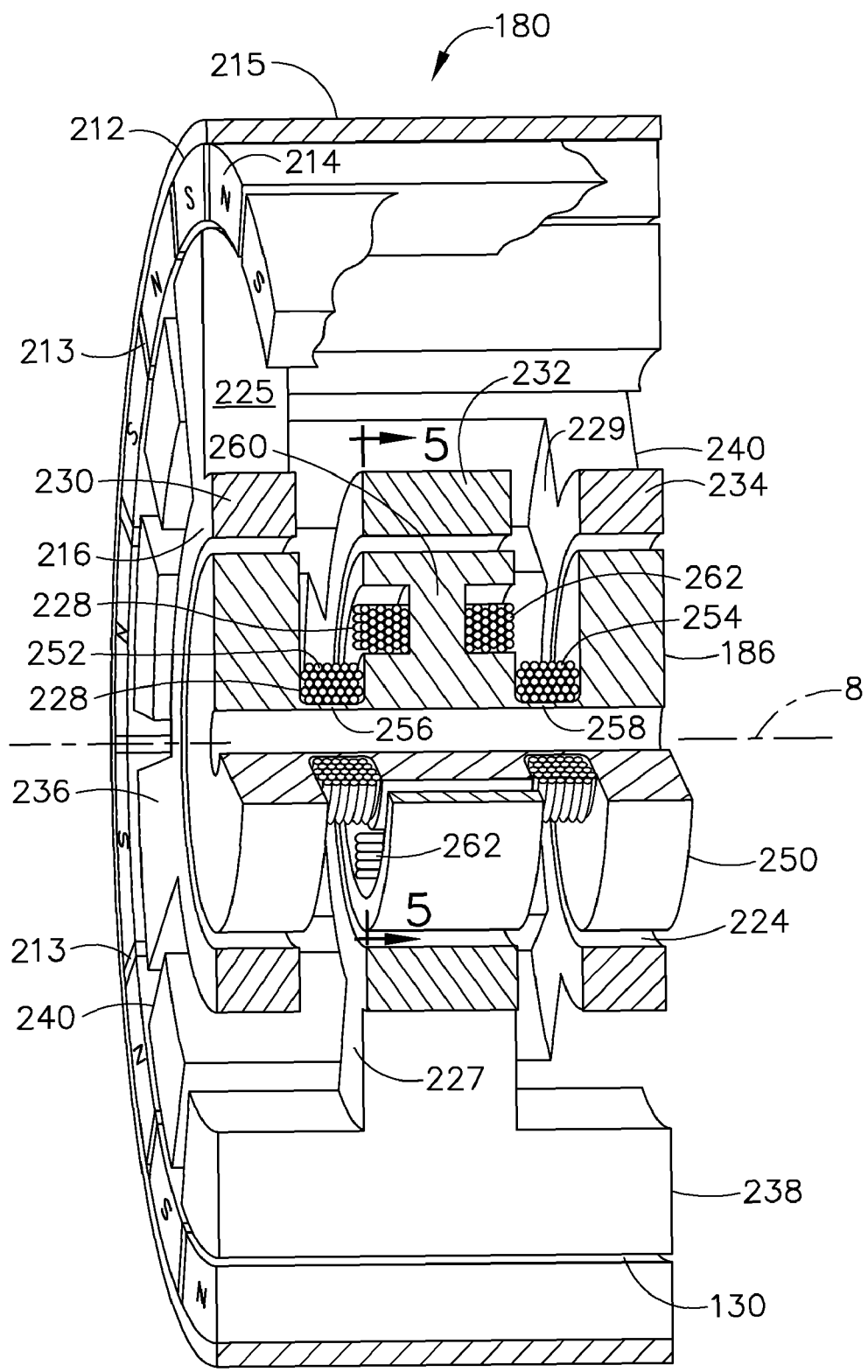
FIG. 4 is a partially cutaway perspective view illustration of the counter-rotatable electrical generator illustrated in FIG. 2.

The counter-rotatable generator 180 is illustrated in greater detail in FIGS. 4-8. Referring to FIG. 4, the counter-rotatable generator 180 is a permanent magnet generator (PMG) including the stator 186, a pole rotor 216, and a magnet rotor 212. The magnet rotor 212 includes a circular array of magnets 214 with circumferentially alternating north/south and south/north orientations N, S. The magnets 214 are radially retained within a magnet retention ring 215. The magnets 214 are circumferentially separated from each other by non-magnetic material spacers 213.

Figure 6:
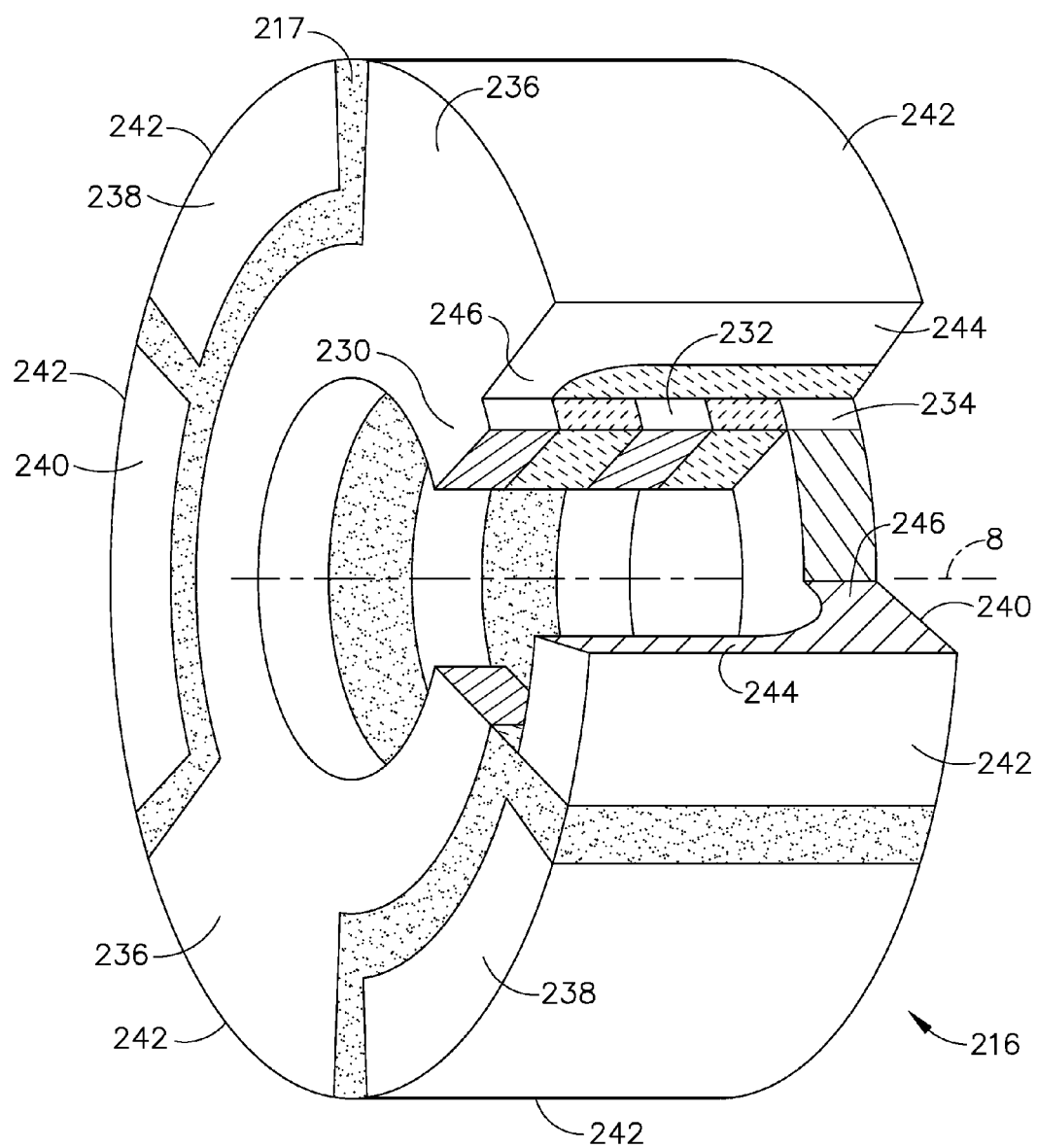
FIG. 6 is a perspective view diagrammatical illustration of the pole rotor of the counter-rotatable electrical generator illustrated in FIG. 4.
Figure 7:
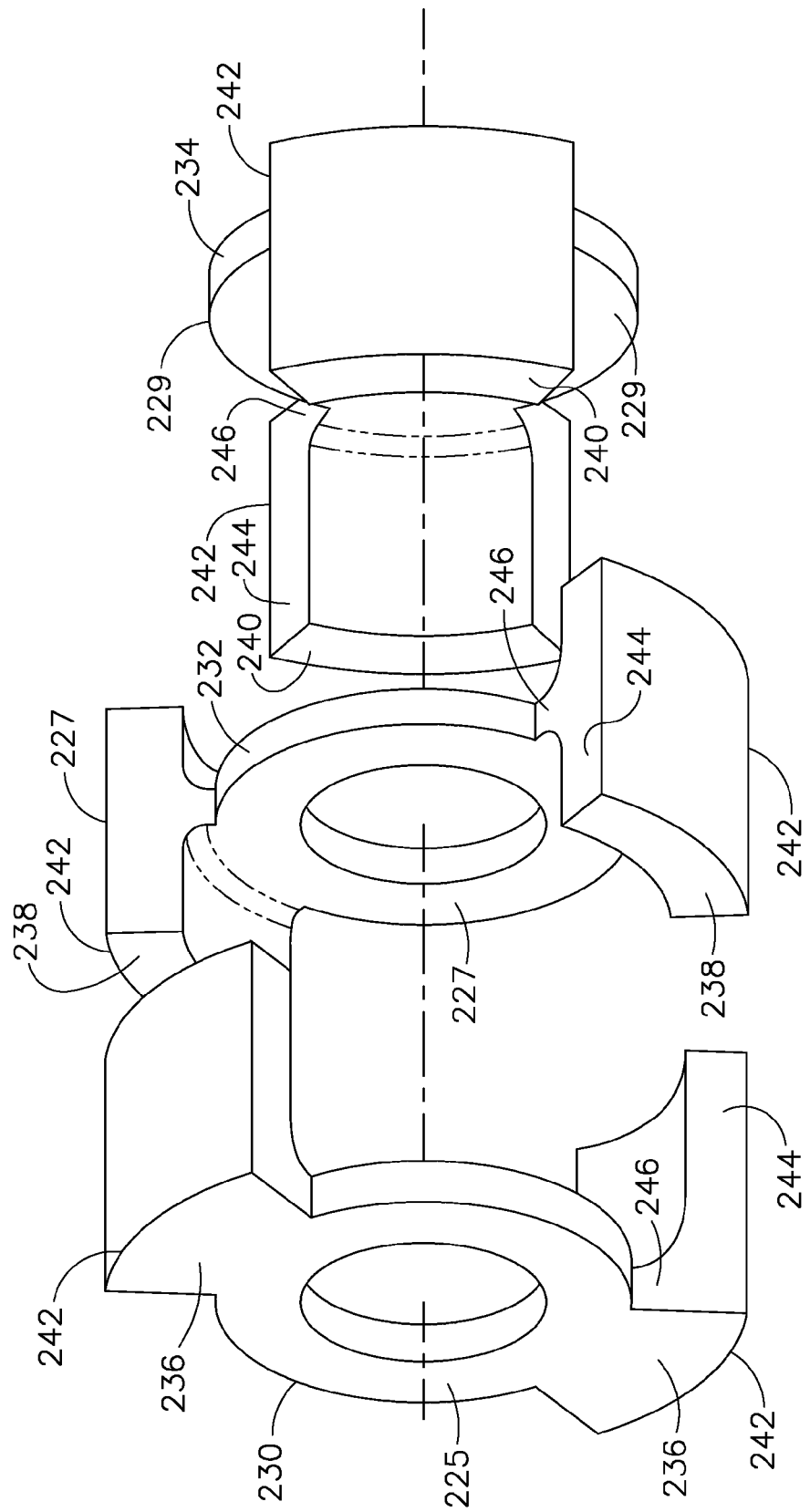
FIG. 7 is an exploded perspective view diagrammatical illustration of the pole rotor illustrated in FIG. 6.

Referring to FIGS. 4, 6, and 7, the pole rotor 216 includes first, second, and third pole assemblies 225, 227, 229 having first, second, and third pole hubs 230, 232, 234 supporting corresponding first, second, and third sets 236, 238, 240 of axially extending rotatable bar poles 242. Each of the bar poles 242 includes an axially extending outer bar 244 connected by a radially extending connector 246 to a respective one of the first, second, and third pole hubs 230, 232, 234. The connector 246 extends radially outwardly from the respective one of the first, second, and third pole hubs 230, 232, 234 to the outer bar 244. Non-magnetic material 217, which may be in the form of an arbor, is disposed axially and radially between the first, second, and third pole assemblies 225, 227, 229. The non-magnetic material 217 is illustrated as transparent hatching and helps provide a solid cylindrically annular shape to the pole rotor 216. The non-magnetic material 217 is not illustrated in FIGS. 4 and 7 for the purpose of clarity.

The pole rotor 216 illustrated in FIGS. 4, 6 and 7 has three hubs, and twelve poles with each pole having one bar and one connector. Alternative embodiments of the pole rotor 216 can include a different number of hubs and a different number of poles on each hub. The hub and pole combination may be made of a magnetic steel and may be homogeneous or laminated. The laminations may be axially stacked along the engine centerline 8. Another possible orientation for the laminations is for hub and bar sections of the laminations to be axially stacked along the centerline 8 and connector sections to be generally circumferentially stacked between the hub and bar sections and the connectors.

Figure 5:
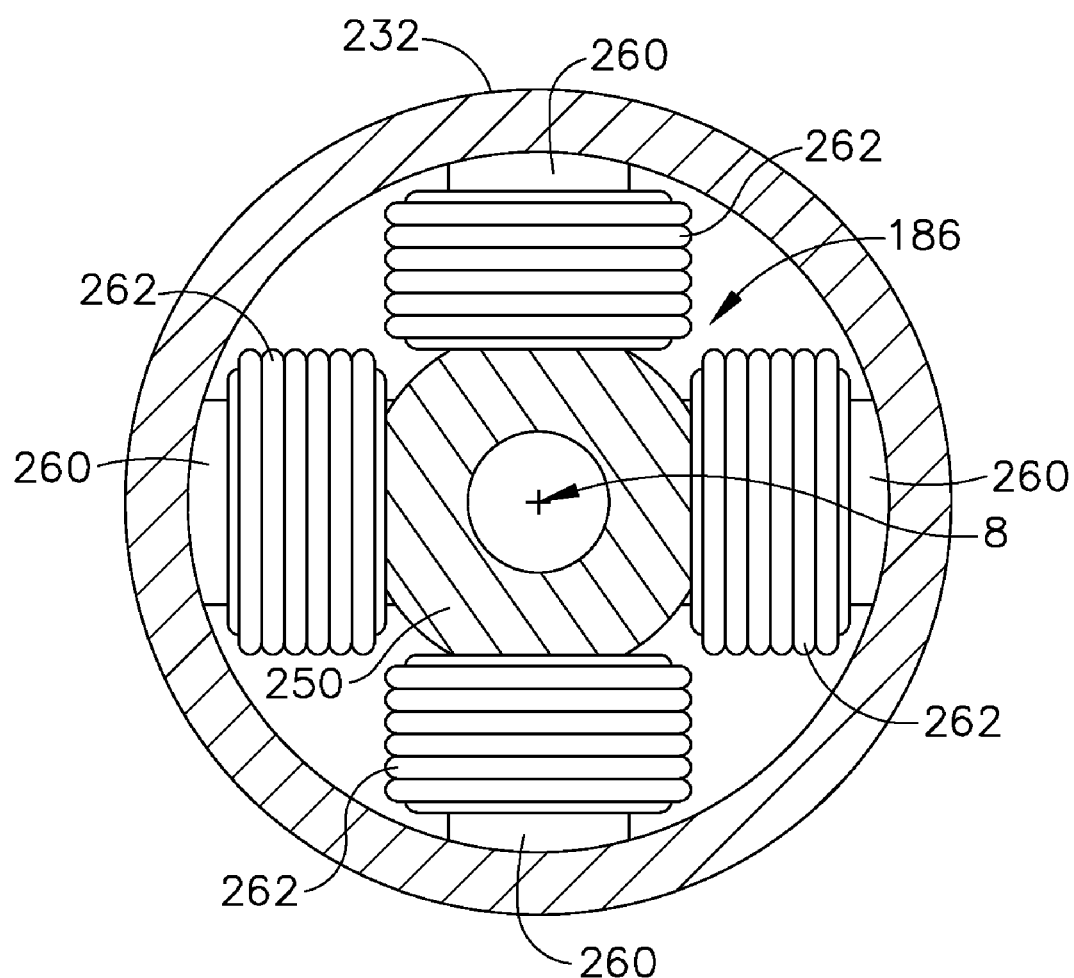
FIG. 5 is an elevational view illustration of stationary radial windings of a stator of the counter-rotatable electrical generator taken through 5-5 in FIG. 4.
Figure 8:
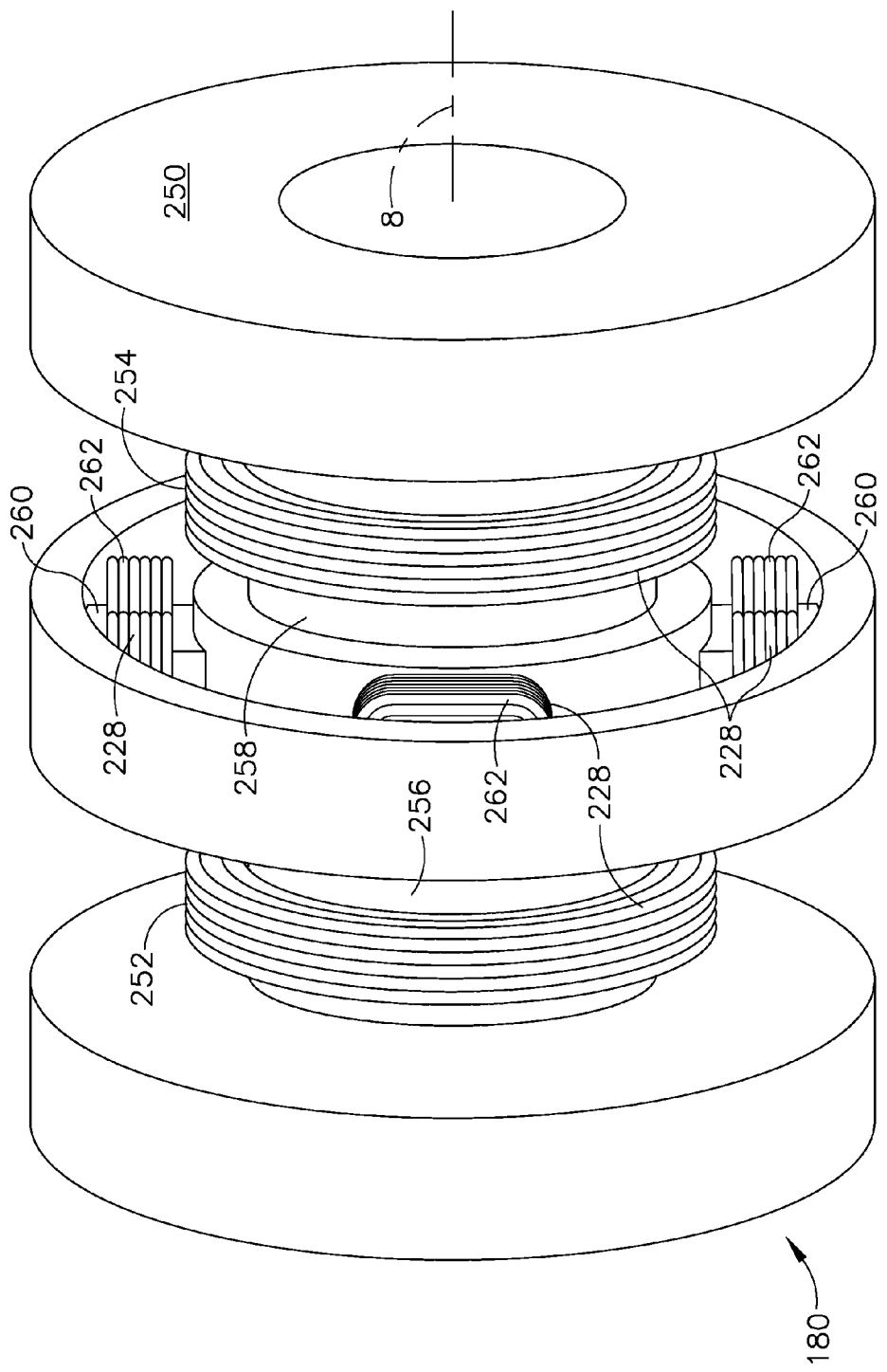
FIG. 8 is a perspective view illustration of the stator of the counter-rotatable electrical generator illustrated in FIG. 4.

Referring to FIGS. 4, 5, and 8, the stator 186 includes a stator cylindrical shaft or annular hub 272 having stationary windings 228 illustrated herein as stationary first and second axial windings 252, 254 and radial windings 262. A generally cylindrical or annular center pole section 250 is centered on the stator cylindrical shaft or annular hub 272 and circumscribed about the centerline 8. The stationary first and second axial windings 252, 254 are wound around annular first and second axial poles 256, 258, respectively that are centered on the stator cylindrical shaft or annular hub 272. Stationary radial poles 260 extend radially outwardly from the center pole section 250 and are axially centered between the first and second axial windings 252, 254. The radial windings 262 are wound around the radial poles 260. The radial poles 260 are equi-angularly spaced about the center pole section 250. The exemplary embodiment of the stator 186 illustrated in FIGS. 4-6 has four radial poles 260. Other embodiments of the counter-rotatable generator 180 may have more or less radial poles, axial poles, and/or magnets 214.

The magnet and pole rotors 212, 216 are counter-rotatable with respect to each other. The magnet rotor 212 is driven in one rotational direction (clockwise or counter-clockwise) and provides a rotating flux field just as it would in a conventional alternator. The pole rotor 216 is driven in another rotational direction (clockwise or counter-clockwise). At any given circumferential position, the flux field alternates between a N-S and S-N polarity with an approximately sinusoidal magnitude. Stationary windings 228 are stationary with respect to the counter-rotatable magnet and pole rotors 212, 216 and are illustrated herein as supported by the fan frame 34 in FIGS. 1 and 2.

Figure 13:
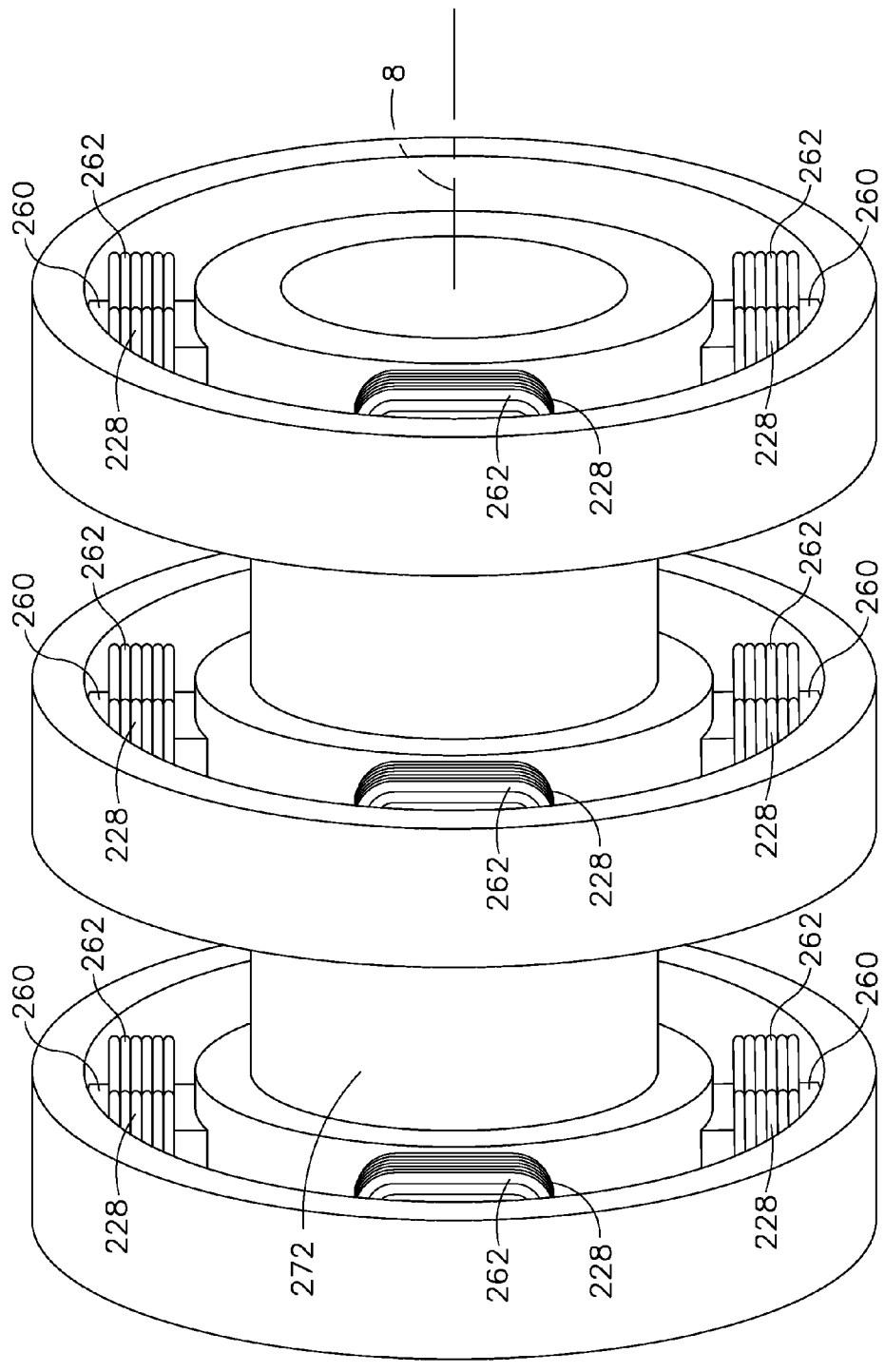
FIG. 13 is a perspective view illustration of an alternative stator for the counter-rotatable electrical generator illustrated in FIG. 4.

An alternative stator 270 is illustrated in FIG. 13. The alternative stator 270 has no axial windings. The alternative stator 270 has three sets (other numbers of sets may be used) of stationary radial poles 260 extending radially outwardly from a stator shaft or hub 272 the hub 272 and are evenly distributed on the hub 272. Radial windings 262 are wound around the radial poles 260. The radial poles 260 are equi-distantly spaced about the hub 272.

In a conventional PMG, the magnet rotor is positioned either inside or outside a fixed coaxial stator, which has poles that conduct the alternating magnetic field through electrical windings on the poles. The alternating magnetic field in the windings induce an electrical field in the windings, thus, generating electrical potential to provide to an external electrical system. For a given geometry and magnet design, the generated voltage is proportional to the frequency at which the field oscillates, that is the speed at which the magnet rotor spins.

The counter-rotatable generator 180 increases the apparent speed of the generator by spinning the rotor in one direction and what is conventionally referred to as the "stator" in another direction. To avoid the need for slip rings to conduct current from the rotating "stator" to the stationary part of the system, a rotating transformer concept is employed whereby the poles are rotated on the pole rotor 216 and the windings 228 are on the generator stator 186, a stationary part of the engine 10, mounted to and supported by the fan frame 34. In the rotating transformer, the flux is conveyed across featureless ring-shaped air-gaps axially separated. A conventional magnet-bearing rotor has to observe the same speed and diameter limits as in the conventional machine, but the pole rotor, having simple magnetic alloy shapes (much like the rotor of a homopolar or induction generator) with no windings or magnets, can be rotated at a higher speed. The counter-rotatable generator 180 includes a rotor air gap 130 between the magnet and pole rotors 212, 216 and the transformer air gap 224 between the pole rotor 216 and the stator 186.

The counter-rotatable generator 180 may be used in various other gas turbine engine installations which provide counter-rotatable gas turbine engine rotor elements. The counter-rotatable generator 180 may be driven, along with counter-rotatable fans, by counter-rotatable low pressure turbines. The counter-rotatable generator 180 may be driven by counter-rotatable high pressure turbines as well. The counter-rotatable generator 180 may be disposed within the engine in a cavity other than a booster cavity 57 such as in a tail cone or centerbody cavity.

Referring to FIGS. 1 and 2, a bypass duct 21 radially bounded by a fan casing 11 and a rotatable annular radially inner bypass duct wall 9 surrounds the booster 16 and a core engine inlet duct 29 to the high pressure compressor 18 of the core engine 25. The fan casing 11 is fixedly connected to the fan frame 34 by fan frame struts 35. A plurality of booster struts 37, radially inwardly supported by the fan frame 34, are disposed in the core engine inlet duct 29 between the fourth booster stage 64 and the fifth booster stage 42. The bypass duct 21 is radially outwardly bounded by the annular fan casing 11 and radially inwardly bounded by an annular radially inner bypass duct wall 9 illustrated in FIG. 2. The radially inner bypass duct wall 9 includes a rotatable wall section 22 fixedly mounted to the first booster blade row 48 of the first booster stage 38. The radially inner bypass duct wall 9 also includes a fixed or non-rotatable wall section 23 fixedly mounted to the fan frame 34.

Figure 9:
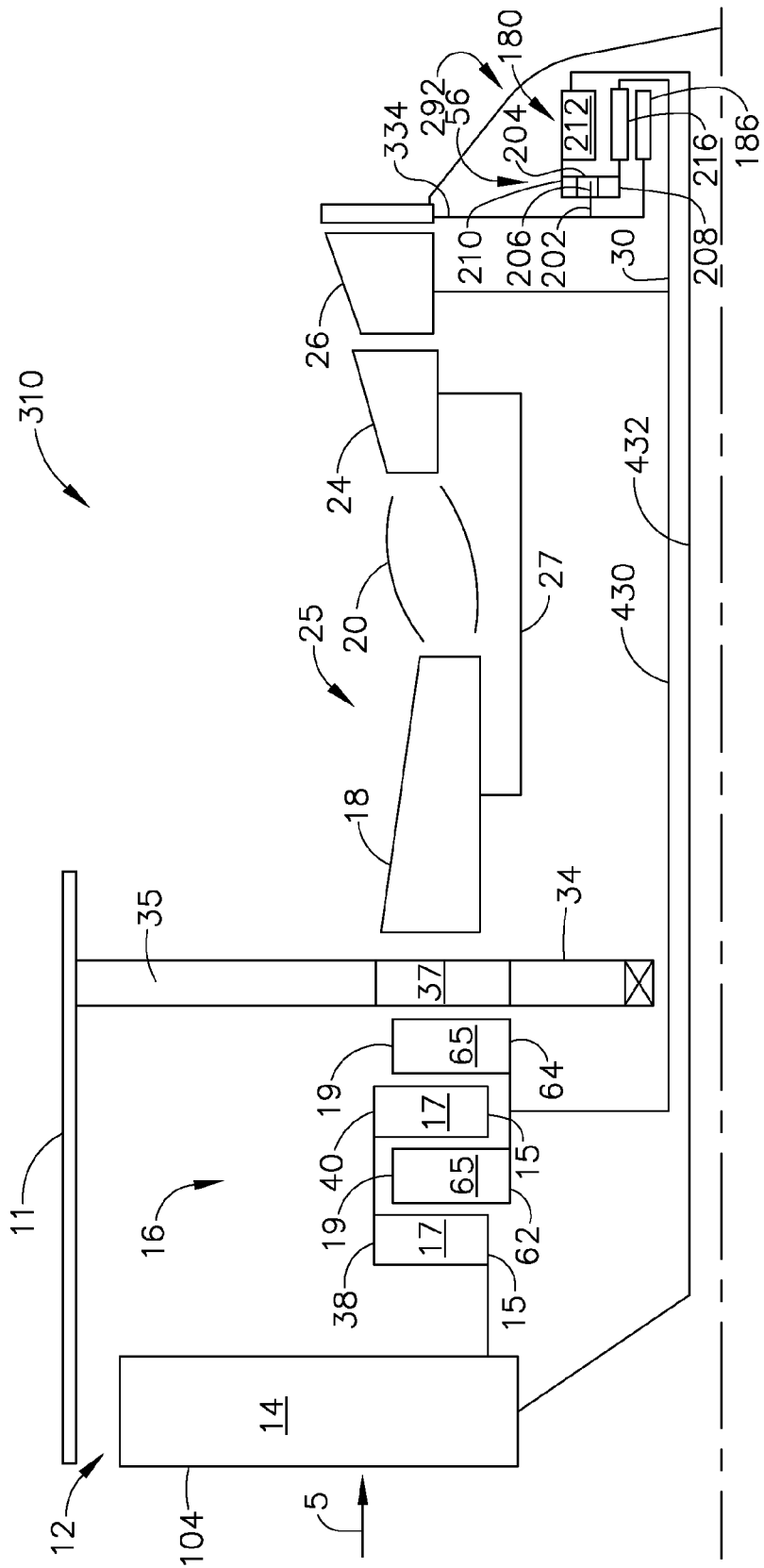
FIG. 9 is a longitudinal sectional view diagrammatical illustration of an exemplary embodiment of an aircraft counter-rotating fan gas turbine engine with counter-rotatable fans and booster stages and a counter-rotatable electrical generator.

Illustrated in FIG. 9 is the turbofan gas turbine engine 10 illustrated in FIG. 1 with the counter-rotatable generator 180 disposed within a tail cone 290 at an aft end 292 of the engine 10. The gearbox 56 is also disposed within the tail cone 290 and the annular carrier 202 is supported by an aft turbine fan frame 134. The planetary gears 204 of the gearbox 56 are rotatably mounted on pins 206 cantilevered off the annular carrier 202. The sun gear 208 is meshed with and rotatably mounted radially inwardly of the planetary gears 204 and the ring gear 210 is meshed with and rotatably mounted radially outwardly of the planetary gears 204. The sun gear 208 and the second set of booster stages 19 are drivenly connected to the low pressure turbine 26 by a radially outer low pressure shaft 430. The sun gear 208 is operable to drive the planetary gears 204 which, in turn, are operable to drive the ring gear 210 and the fan stage 104 and the first set of booster stages 15 which are drivenly connected to the ring gear 210 by a radially inner low pressure shaft 432. Thus, the second set of booster stages 19 are operable to counter-rotate with respect to the fan stage 104 and the first set of booster stages 15.

Figure 10:
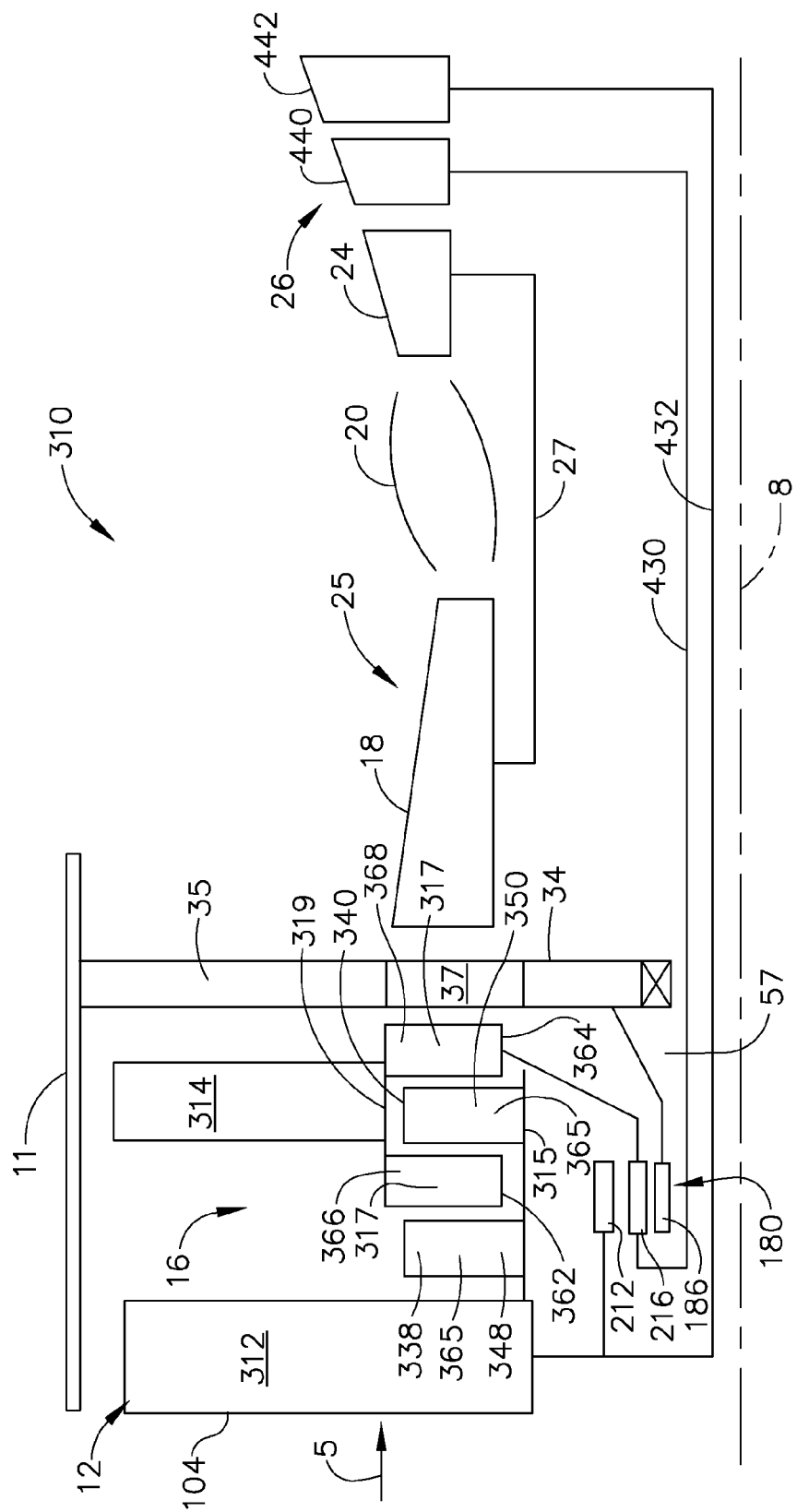
FIG. 10 is a longitudinal sectional view diagrammatical illustration of an exemplary embodiment of an aircraft turbofan gas turbine engine with a counter-rotatable electrical generator mounted within a booster cavity of the engine and powered by counter-rotatable low pressure turbines.

Illustrated in FIG. 10 is a longitudinal sectional view diagram of another exemplary embodiment of an aircraft counter-rotating fan gas turbine engine 310 including a fan section 12 having counter-rotatable forward and aft fan stages 312, 314 circumscribed about an engine centerline 8. Ambient air 5 flows through fan blades 14 of the forward and aft fan stages 312, 314 in the fan section 12. Downstream of the fan section 12 is a counter-rotatable booster 16 with counter-rotatable first and second sets of booster stages 315, 319. The first set of booster stages 315 is connected to and rotatable with the forward fan stage 312. The second set of booster stages 319 is connected to and rotatable with the aft fan stages 314.

The first set of booster stages 315 includes first and third booster stages 338, 340 of rotatable booster blades 365. The second set of booster stages 319 includes counter-rotatable second and fourth booster stages 362, 364 with counter-rotatable booster blades 317. One of the first and second sets of booster stages 315, 319 is rotatable in a clockwise direction about the engine centerline 8 and another of the first and second sets of booster stages 315, 319 is rotatable in a counter-clockwise direction about the engine centerline 8. Thus, the first and second sets of booster stages 315, 319 may be described as being counter-rotatable with respect to each other.

The first and third booster stages 338, 340 have first and third booster blade rows 348, 350, respectively. The second and fourth booster stages 362, 364 have second and fourth booster blade rows 366, 368, respectively. The first and third booster blade rows 348, 350 are interdigitated with the second and fourth booster blade rows 366, 368.

The counter-rotatable generator 180 disposed within the booster cavity 57 and driven directly by counter-rotatable first and second turbine sections 440, 442 of a low pressure turbine 26 without the use of a gearbox 56. A radially inner pole rotor 216 encircles a generator stator 186, mounted to and supported by the fan frame 34, and a radially outer magnet rotor 212 encircles the radially inner pole rotor 216. The radially outer magnet rotor 212 and the radially inner pole rotor 216 counter-rotate during the engine's operation. The counter-rotatable generator 180 has an axis of rotation coinciding with the engine centerline 8 about which the radially inner pole rotor 216 and the radially outer magnet rotor 212 counter-rotate during the engine's operation.

The pole rotor 216, the forward fan stage 312, and the first set of booster stages 315 are drivenly connected to the first turbine section 440 of the low pressure turbine 26 by a radially outer low pressure shaft 430. The magnet rotor 212, the aft fan stage 314, and the second set of booster stages 319 are drivenly connected to the second turbine section 442 of the low pressure turbine 26 by a radially inner low pressure shaft 432.

Figure 11:
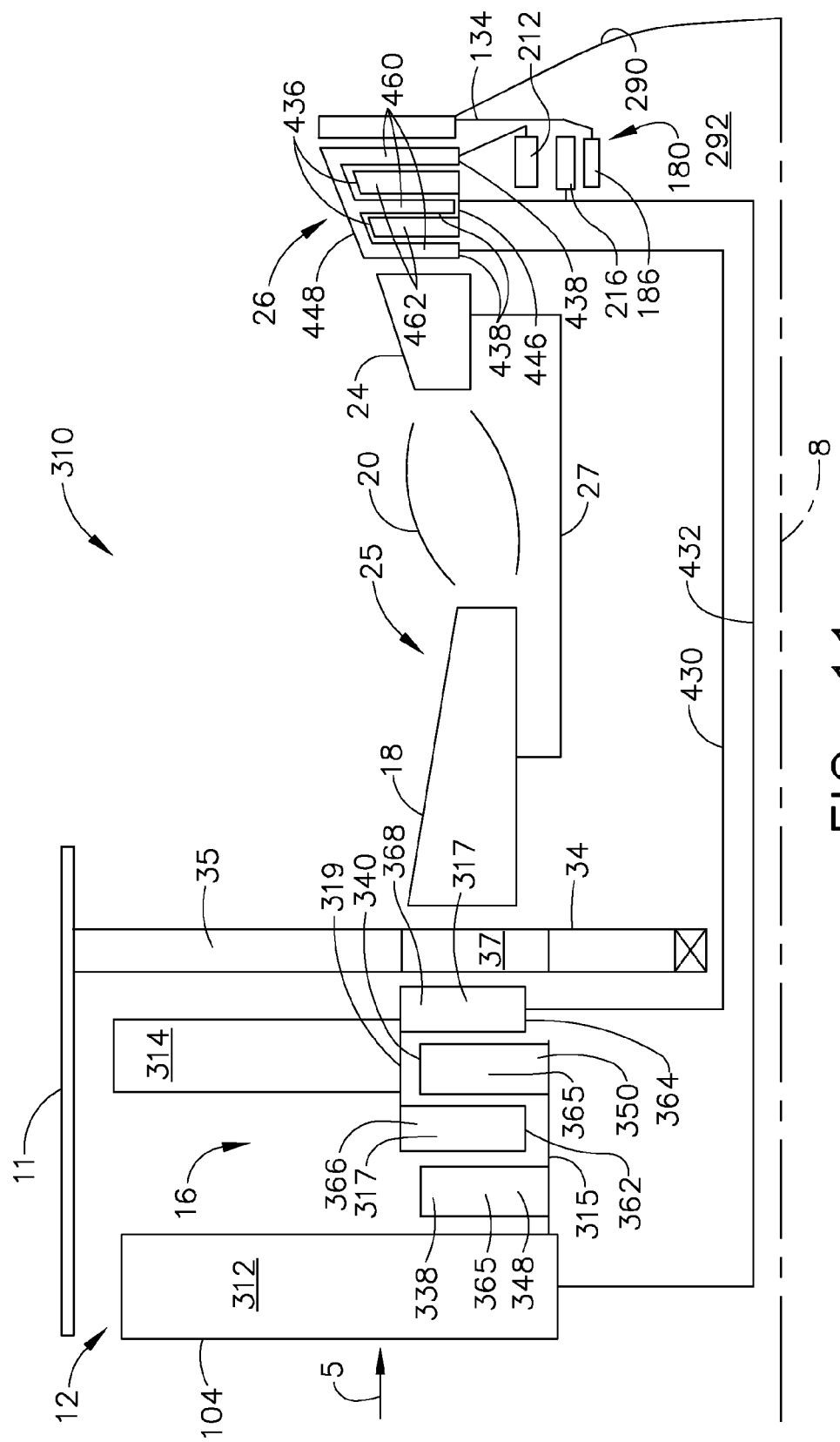
FIG. 11 is a longitudinal sectional view diagrammatical illustration of an exemplary embodiment of an aircraft turbofan gas turbine engine with a counter-rotatable electrical generator mounted in a tail cone of the engine and powered by interdigitated counter-rotatable low pressure turbines.

Illustrated in FIG. 11 is a longitudinal sectional view diagram of another exemplary embodiment of an aircraft counter-rotating fan gas turbine engine 310 including a fan section 12 having counter-rotatable forward and aft fan stages 312, 314 circumscribed about an engine centerline 8, the counter-rotatable generator 180 disposed within a tail cone 290 at an aft end 292 of the engine 310, and the counter-rotatable generator 180 directly driven by annular low pressure inner and outer drum rotors 446, 448 of a counter-rotatable low pressure turbine 26.

Ambient air 5 flows through fan blades 14 of the forward and aft fan stages 312, 314 in the fan section 12. Downstream of the fan section 12 is a counter-rotatable booster 16 with counter-rotatable first and second sets of booster stages 315, 319. The first set of booster stages 315 is connected to and rotatable with the forward fan stage 312. The second set of booster stages 319 is connected to and rotatable with the aft fan stages 314.

The first set of booster stages 315 includes first and third booster stages 338, 340 of rotatable booster blades 365. The second set of booster stages 319 includes counter-rotatable second and fourth booster stages 362, 364 with counter-rotatable booster blades 317. One of the first and second sets of booster stages 315, 319 is rotatable in a clockwise direction about the engine centerline 8 and another of the first and second sets of booster stages 315, 319 is rotatable in a counter-clockwise direction about the engine centerline 8. Thus, the first and second sets of booster stages 315, 319 may be described as being counter-rotatable with respect to each other.

The first and third booster stages 338, 340 have first and third booster blade rows 348, 350, respectively. The second and fourth booster stages 362, 364 have second and fourth booster blade rows 366, 368, respectively. The first and third booster blade rows 348, 350 are interdigitated with the second and fourth booster blade rows 366, 368.

The inner drum rotor 446 includes a plurality of axially spaced second low pressure turbine blade rows 436 having low pressure second turbine blades 462 extending radially outwardly from the inner drum rotor 446. The outer drum rotor 448 includes a plurality of axially spaced first low pressure turbine blade rows 438 having low pressure first turbine blades 460 extending radially inwardly from the outer drum rotor 448. The first low pressure turbine blade rows 438 are interdigitated with the second low pressure turbine blade rows 436.

The counter-rotatable generator 180 includes a radially inner pole rotor 216 encircling a generator stator 186, mounted to and supported by an aft turbine frame 134, and a radially outer magnet rotor 212 encircling the radially inner pole rotor 216. The radially outer magnet rotor 212 and the radially inner pole rotor 216 counter-rotate during the engine's operation. The counter-rotatable generator 180 has an axis of rotation coinciding with the engine centerline 8 about which the radially inner pole rotor 216 and the radially outer magnet rotor 212 counter-rotate during the engine's operation.

The pole rotor 216, the forward fan stage 312, and the first set of booster stages 315 are drivenly connected to the inner drum rotor 446 of the low pressure turbine 26. The magnet rotor 212, the aft fan stage 314, and the second set of booster stages 319 are drivenly connected to the outer drum rotor 448 of the low pressure turbine 26. Thus, the pole rotor 216, the forward fan stage 312, and the first set of booster stages 315 counter-rotate with respect to the magnet rotor 212, the aft fan stage 314, and the second set of booster stages 319 during engine operation.

A radially outer low pressure shaft 430 drivingly connects the outer drum rotor 448 to the aft fan stage 314 and the second set of booster stages 319. A radially inner low pressure shaft 432 drivingly connects the inner drum rotor 446 to the aft fan stage 314 and the second set of booster stages 319. The counter-rotatable generator 180 directly driven by annular low pressure inner and outer drum rotors 446, 448 of a counter-rotatable low pressure turbine 26.

Figure 12:
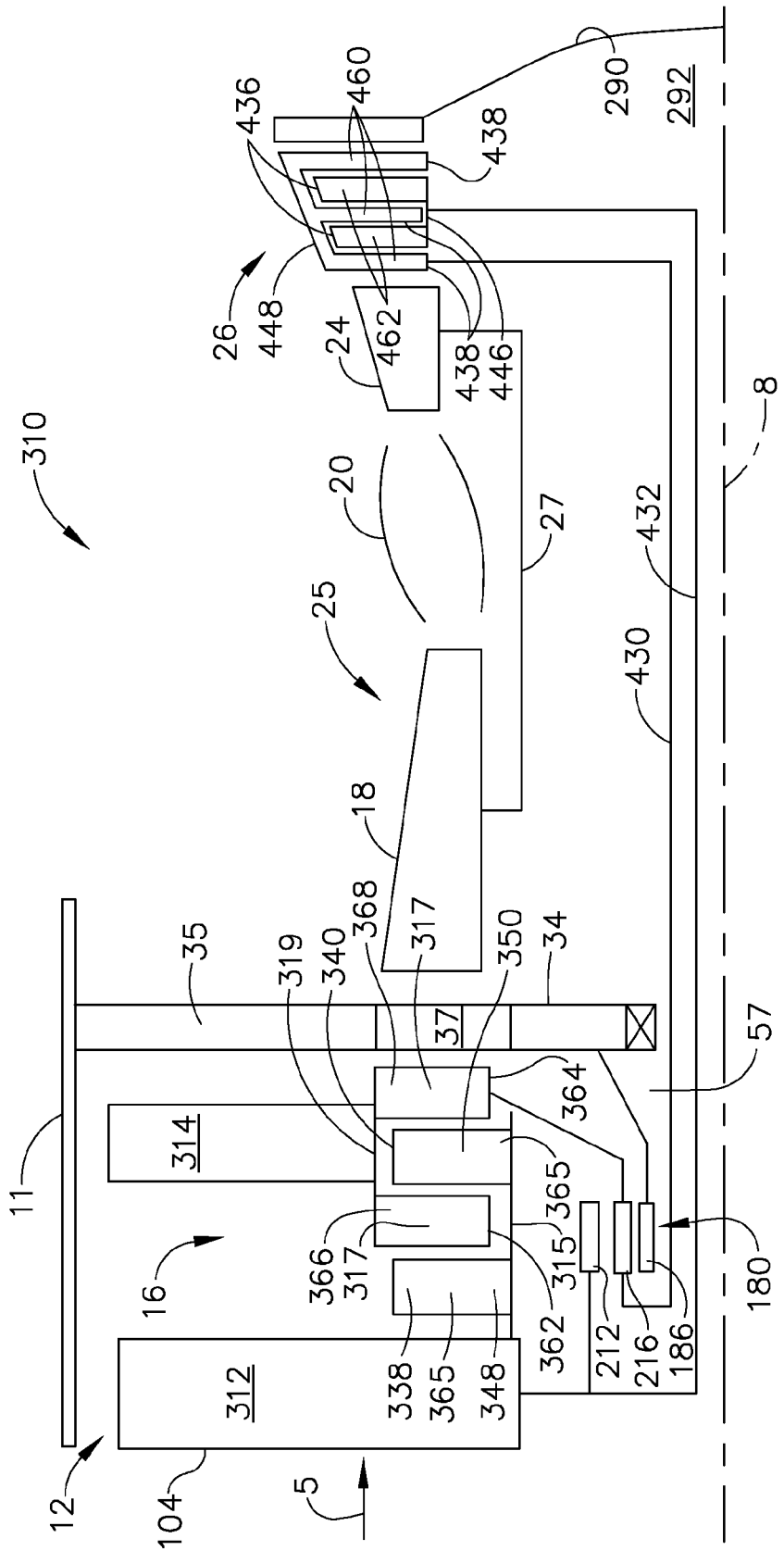
FIG. 12 is a longitudinal sectional view diagrammatical illustration of an exemplary embodiment of an aircraft turbofan gas turbine engine with a counter-rotatable electrical generator mounted within a booster cavity of the engine and powered by interdigitated counter-rotatable low pressure turbines.

Illustrated in FIG. 12 is a longitudinal sectional view diagram of another exemplary embodiment of an aircraft counter-rotating fan gas turbine engine 310 similar to the one illustrated in FIG. 10 with the counter-rotatable generator 180 disposed within the booster cavity 57 but directly driven by counter-rotatable annular low pressure inner and outer drum rotors 446, 448 of a counter-rotatable low pressure turbine 26 as illustrated in FIG. 11.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An aircraft gas turbine engine comprising:
   a low pressure turbine,
   a counter-rotatable generator drivenly connected to the turbine,
   the counter-rotatable generator including a generator stator and counter-rotatable radially inner pole and outer magnet rotors, and
   the generator stator and the counter-rotatable radially inner pole and outer magnet rotors being concentric.

2. An aircraft gas turbine engine as claimed in claim 1, further comprising a gearbox operably disposed between the turbine and the counter-rotatable generator for counter-rotating the radially inner pole and outer magnet rotors during engine operation.

3. An aircraft gas turbine engine as claimed in claim 2, further comprising:
   a fan section including a fan stage of fan blades,
   a counter-rotatable booster including counter-rotatable first and second sets of booster stages downstream of the fan section,
   the fan stage of fan blades and the first set of booster stages being co-rotatable with a first one of the radially inner pole and outer magnet rotors, and
   the second set of booster stages being co-rotatable with a second one of the radially inner pole and outer magnet rotors.

4. An aircraft gas turbine engine as claimed in claim 3, further comprising the counter-rotatable generator and the gearbox disposed within a booster cavity of the engine located radially inwardly of the counter-rotatable first and second sets of booster stages of the counter-rotatable booster.

5. An aircraft gas turbine engine as claimed in claim 4, further comprising the radially outer magnet rotor, the radially inner pole rotor, and the generator stator being concentric.

6. An aircraft gas turbine engine as claimed in claim 5, further comprising:
   the radially outer magnet rotor encircling the radially inner pole rotor,
   the radially inner pole rotor encircling the generator stator,
   a rotor air gap between the magnet and pole rotors, and
   a transformer air gap between the pole rotor and the stator.

7. An aircraft gas turbine engine as claimed in claim 3, further comprising first booster blade rows of the first set of booster stages interdigitated with second booster blade rows of the second set of booster stages respectively.

8. An aircraft gas turbine engine as claimed in claim 3, further comprising:
   the turbine being a low pressure turbine;
   the pole rotor, the fan stage, and the first set of booster stages drivenly connected to the low pressure turbine; and
   the magnet rotor and the second set of booster stages drivenly connected counter-rotatably with respect to the fan stage through the gearbox to the low pressure turbine.

9. An aircraft gas turbine engine as claimed in claim 8, further comprising:

the counter-rotatable generator and the gearbox disposed within a booster cavity of the engine located radially inwardly of the counter-rotatable first and second sets of booster stages of the counter-rotatable booster;

the radially outer magnet rotor, the radially inner pole rotor, and the generator stator being concentric;

the radially outer magnet rotor encircling the radially inner pole rotor;

the radially inner pole rotor encircling the generator stator;

a rotor air gap between the magnet and pole rotors; and a transformer air gap between the pole rotor and the stator.

10. An aircraft gas turbine engine as claimed in claim 9, further comprising:

the gearbox including an annular carrier supported by a fan frame of the engine and planetary gears rotatably mounted on pins cantilevered off the annular carrier, the gearbox further including a sun gear meshed with and rotatably mounted radially inwardly of the planetary gears, the gearbox further including a ring gear meshed with and rotatably mounted radially outwardly of the planetary gears, the second set of booster stages connected to the sun gear, and the sun gear drivenly connected to the low pressure turbine by a low pressure shaft.

11. An aircraft gas turbine engine as claimed in claim 10, further comprising first booster blade rows of the first set of booster stages interdigitated with second booster blade rows of the second set of booster stages respectively.

12. An aircraft gas turbine engine as claimed in claim 2, further comprising:

the gearbox disposed within a tail cone of the engine, the gearbox including an annular carrier supported by an aft turbine fan frame of the engine and planetary gears rotatably mounted on pins cantilevered off the annular carrier, the gearbox further including a sun gear meshed with and rotatably mounted radially inwardly of the planetary gears, and the gearbox further including a ring gear meshed with and rotatably mounted radially outwardly of the planetary gears.

13. An aircraft gas turbine engine as claimed in claim 12, further comprising:

the turbine being a low pressure turbine, a fan section including a fan stage of fan blades, a counter-rotatable booster including counter-rotatable first and second sets of booster stages downstream of the fan section, the sun gear and the second set of booster stages drivenly connected to the low pressure turbine by a radially outer low pressure shaft, and the fan stage and the first set of booster stages drivenly connected to the ring gear by a radially inner low pressure shaft.

14. An aircraft gas turbine engine as claimed in claim 13, further comprising:

the radially outer magnet rotor, the radially inner pole rotor, and the generator stator being concentric;

the radially outer magnet rotor encircling the radially inner pole rotor;

the radially inner pole rotor encircling the generator stator;

a rotor air gap between the magnet and pole rotors; and a transformer air gap between the pole rotor and the stator.

15. An aircraft gas turbine engine as claimed in claim 14, further comprising first booster blade rows of the first set of booster stages interdigitated with second booster blade rows of the second set of booster stages respectively.

16. An aircraft gas turbine engine as claimed in claim 2, further comprising:

a fan section including counter-rotatable forward and aft fan stages, a counter-rotatable booster including counter-rotatable first and second sets of booster stages downstream of the fan section, the first set of booster stages connected to and rotatable with the forward fan stage, the second set of booster stages connected to and rotatable with the aft fan stages, the turbine being a low pressure turbine, and the counter-rotatable generator directly drivenly connected to the counter-rotatable first and second turbine sections of the low pressure turbine.

17. An aircraft gas turbine engine as claimed in claim 16, further comprising:

the counter-rotatable generator disposed within a booster cavity of the engine located radially inwardly of the counter-rotatable first and second sets of booster stages of the counter-rotatable booster, the pole rotor, the forward fan stage, and the first set of booster stages are drivenly connected to the first turbine section of the low pressure turbine by a radially outer low pressure shaft, and the magnet rotor, the aft fan stage, and the second set of booster stages are drivenly connected to the second turbine section of the low pressure turbine by a radially inner low pressure shaft.

18. An aircraft gas turbine engine as claimed in claim 2, further comprising:

the turbine being a low pressure turbine, a fan section including counter-rotatable forward and aft fan stages, a counter-rotatable booster including counter-rotatable first and second sets of booster stages downstream of the fan section, the first set of booster stages connected to and rotatable with the forward fan stage, the second set of booster stages connected to and rotatable with the aft fan stages, the turbine being a low pressure turbine, and the counter-rotatable generator directly drivenly connected to the counter-rotatable low pressure inner and outer drum rotors of the low pressure turbine.

19. An aircraft gas turbine engine as claimed in claim 18, further comprising:

the radially outer magnet rotor, the radially inner pole rotor, and the generator stator being concentric;

the radially outer magnet rotor encircling the radially inner pole rotor;

the radially inner pole rotor encircling the generator stator;

a rotor air gap between the magnet and pole rotors; and a transformer air gap between the pole rotor and the stator.

20. An aircraft gas turbine engine as claimed in claim 19, further comprising first booster blade rows of the first set of booster stages interdigitated with second booster blade rows of the second set of booster stages respectively.

21. An aircraft gas turbine engine as claimed in claim 20, further comprising:

the counter-rotatable generator disposed within a tail cone of the engine, the pole rotor, the forward fan stage, and the first set of booster stages are drivenly connected to the first turbine section of the low pressure turbine by a radially outer low pressure shaft, and the magnet rotor, the aft fan stage, and the second set of booster stages are drivenly connected to the second turbine section of the low pressure turbine by a radially inner low pressure shaft.

22. An aircraft gas turbine engine as claimed in claim 20, further comprising:

the counter-rotatable generator disposed within a booster cavity of the engine, the magnet rotor, the forward fan stage, and the first set of booster stages are drivenly connected to the low pressure inner drum rotor of the low pressure turbine by a radially inner low pressure shaft, and the pole rotor, the aft fan stage, and the second set of booster stages are drivenly connected to the low pressure outer drum rotor of the low pressure turbine by a radially outer low pressure shaft.

23. An aircraft gas turbine engine as claimed in claim 1, further comprising:

the radially outer magnet rotor, the radially inner pole rotor, and the generator stator being concentric about an engine centerline, the pole rotor including pole assemblies having pole hubs supporting corresponding sets of rotatable axially extending bar poles, each of the bar poles including a radially outer bar connected by a radially extending connector to a respective one of the pole hubs, the stator including a generally cylindrically annular center pole section circumscribed and centered about a centerline, the center pole section including stationary axial windings wound around annular axial poles, radial poles extending radially outwardly from the center pole section and centered between the axial windings, and radial windings wound around the radial poles.

24. An aircraft gas turbine engine as claimed in claim 23, further comprising:

the radially outer magnet rotor encircling the radially inner pole rotor, the radially inner pole rotor encircling the generator stator, a rotor air gap between the magnet and pole rotors, and a transformer air gap between the pole rotor and the stator.

25. An aircraft gas turbine engine as claimed in claim 24, further comprising the counter-rotatable generator disposed within a booster cavity or a tail cone of the engine.

26. An aircraft gas turbine engine as claimed in claim 25, further comprising a gearbox operably disposed between the turbine and the counter-rotatable generator for counter-rotating the radially inner pole and outer magnet rotors during engine operation.

* * * * *